United States Patent [19]

Bethel et al.

[11] Patent Number: 4,864,986
[45] Date of Patent: Sep. 12, 1989

[54] TWO-CYCLE ENGINE WITH OFFSET PISTON OVALITY

[75] Inventors: Steven J. Bethel, Oakfield; Robert J. Baumhardt, Eden, both of Wis.

[73] Assignee: Brunswick Corporation, Skokie, Ill.

[21] Appl. No.: 249,378

[22] Filed: Sep. 26, 1988

[51] Int. Cl.⁴ .............................................. F16J 1/00
[52] U.S. Cl. .............................. 123/193 P; 123/65 R; 92/177
[58] Field of Search ................. 123/65 R, 193 P, 663; 92/177

[56] References Cited

U.S. PATENT DOCUMENTS

| | | | |
|---|---|---|---|
| 3,943,908 | 3/1976 | Kubis et al. | 123/193 P |
| 4,383,508 | 5/1983 | Irimajiri et al. | 123/193 P |

FOREIGN PATENT DOCUMENTS

| | | | |
|---|---|---|---|
| 2913418 | 10/1980 | Fed. Rep. of Germany | 92/177 |
| 0081143 | 5/1982 | Japan | 123/193 P |
| 0023048 | 2/1984 | Japan | 123/193 P |
| 2055966 | 3/1981 | United Kingdom | 123/193 P |

OTHER PUBLICATIONS

"Experimental Method of Determining Piston Profile By Use of Composite Materials", Toshiro Yagi et al., SAE Passenger Car Meeting, Troy, Michigan, Jun. 7-10, 1982, 820769, pp. 1-9, 0148-7191/82-0607-0769.

Primary Examiner—David A. Okonsky
Attorney, Agent, or Firm—Andrus, Sceales, Starke & Sawall

[57] ABSTRACT

In a two-cycle internal combustion engine (10), the piston (20) has an outer peripheral oval shape (58) with a minor axis (62) offset from the centerline (54) of the wrist pin (26) towards a line (56) through the intake and exhaust ports (16 and 18). The outer peripheral shape of the piston also has increasing ovality, from at least the wrist pin (26) upwardly to at least the piston rings (22, 24).

8 Claims, 2 Drawing Sheets

TWO-CYCLE ENGINE WITH OFFSET PISTON OVALITY

BACKGROUND AND SUMMARY

The invention arose during continuing development efforts in two cycle outboard marine engines.

The invention particularly addresses and solves problems of thermal distortion of the piston relative to the cylinder bore. In the present invention, the shape of the piston is matched to the cylinder bore to accommodate thermal distortion.

The invention also reduces the tendency of piston scuffing which is caused by a breakdown of lubrication between the piston skirt and the cylinder bore sidewall. This can cause local melting of metal material which then smears along the side of the cylinder bore sidewall and causes piston sticking.

In conventional designs, the piston shape is cammed across the wrist pin, i.e. the piston has a cross section therethrough along a plane perpendicular to the direction of axial movement of the piston, which cross section has an outer peripheral generally oval shape with a minor axis generally along the smallest diameter dimension, which minor axis extends along the wrist pin.

In the present invention, the minor axis is offset from the wrist pin toward a line through the distally opposite intake and exhaust ports, and preferably the minor axis extends through such ports. It was found that offsetting the minor axis of the oval from the wrist pin toward a line through the intake and exhaust ports, and preferably through such ports, provided superior performance and piston profile tolerance to the cylinder bore. It is believed that this performance is due to such minor axis enabling cylinder bore expansion at the ports toward the piston. This is believed particularly significant at the exhaust port, where higher temperatures occur.

The invention also enables much tighter tolerances between the piston skirt and the cylinder bore sidewall, which in turn provides improved sealing in a two stroke engine. In addition to reduction of piston scuffing and tighter skirt to bore clearances, the invention also provides improved low speed running quality and a reduction in piston slap noise.

The invention further enables piston profile shaping to match cylinder bore distortion, which latter has been found difficult to quantify. In the present invention, the thrust load is evenly distributed to create an oil film between the cylinder bore sidewall and the piston to ensure continued hydrodynamic lubrication and resistance to scuffing. This is done by identifying the degree of cylinder bore distortion and in which cylinder such distortion occurs, and then profiling the piston to match same under conditions of thermal distortion, i.e. once bore distortion and piston expansion are known, the shapes to be machined when cold can be accomplished to render relative shapes to support hydrodynamic lubrication.

BRIEF DESCRIPTION OF THE DRAWINGS

FIG. 4 shows exaggerated ovality to facilitate understanding.

FIG. 5 shows exaggerated ovality to facilitate understanding.

DETAILED DESCRIPTION

Figure 1:
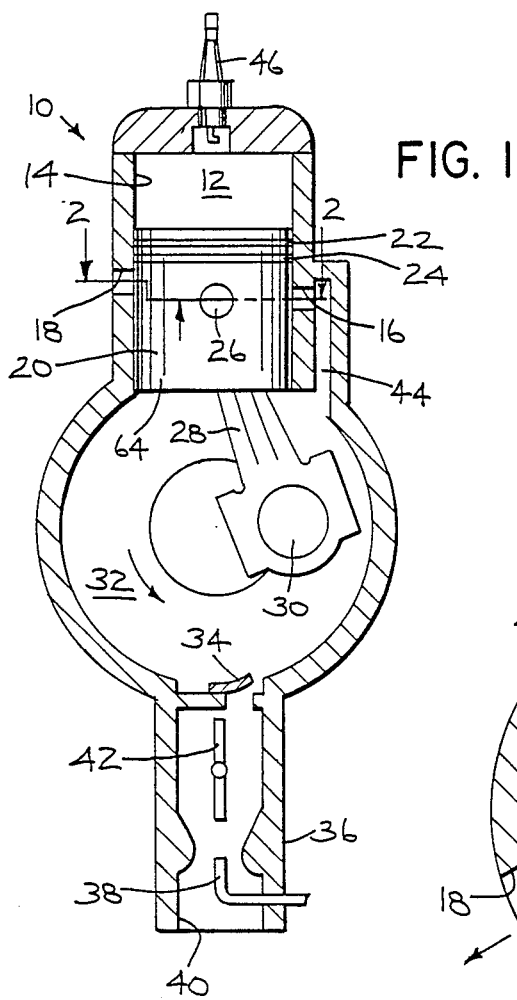
FIG. 1 is a schematic illustration of a two-cycle internal combustion engine.
Figure 2:
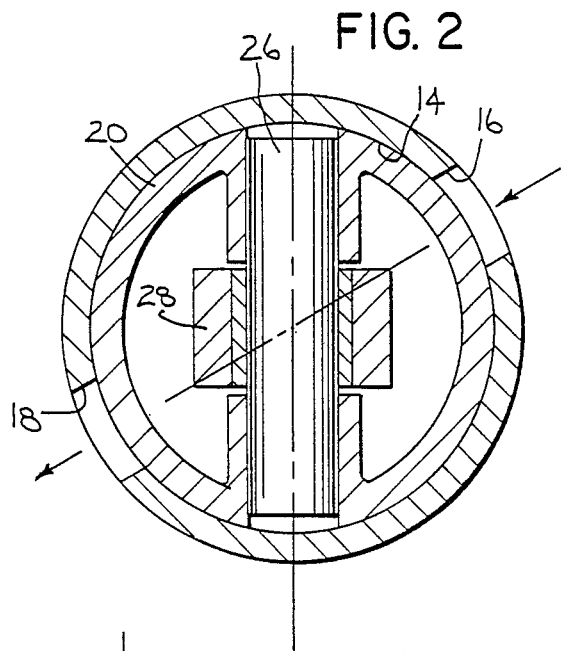
FIG. 2 is a sectional view taken along line 2—2 of FIG. 1.
Figure 3:
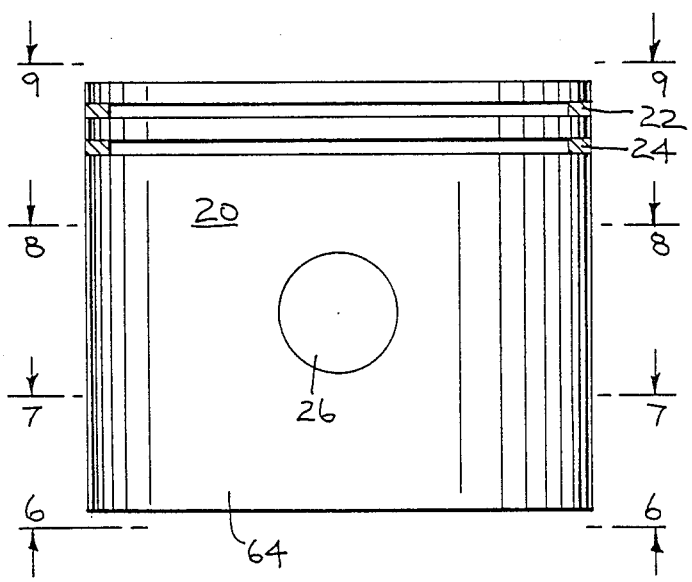
FIG. 3 is an enlarged view of the piston of FIG. 1.

FIG. 1 shows a two-cycle internal combustion engine 10 having a combustion chamber 12 defined by a cylinder bore 14 having facing generally distally opposite intake and exhaust ports 16 and 18. Piston 20 is axially reciprocal in the cylinder bore. The piston moves upwardly in FIG. 1 in a charging stroke, and downwardly in a power stroke. The piston has one or more piston rings 22 and 24 near the top thereof. The piston has a wrist pin 26, FIGS. 1 and 2, extending thereacross beneath the piston rings and rotatably journaled to the upper end of a conecting rod 28, which rod has a lower end rotatably journaled to a crankshaft 30, all as is known in the art.

During the upward charging stroke of piston 20, a vacuum is created in crankcase 32 which opens one-way reed valve 34 and draws a fuel-air mixture therethrough from carburetor 36 through fuel nozzle 38 and carburetor throat 40 as controlled by butterfly throttle valve 42. During the downward power stroke of piston 20, crankcase 32 is pressurized, which closes reed valve 34 and forces the fuel-air mixture in crankcase 32 to flow through transfer passage 44 to intake port 16 to introduce the fuel-air charge into combustion chamber 12. Upon the upward stroke of piston 20, the fuel-air mixture in combustion chamber 12 is compressed for ignition by spark plug 46, and the spent combustion products are exhausted at exhaust port 18 during the downward power stroke of the piston, and the cycle repeated, all as known in the art.

Figure 4:
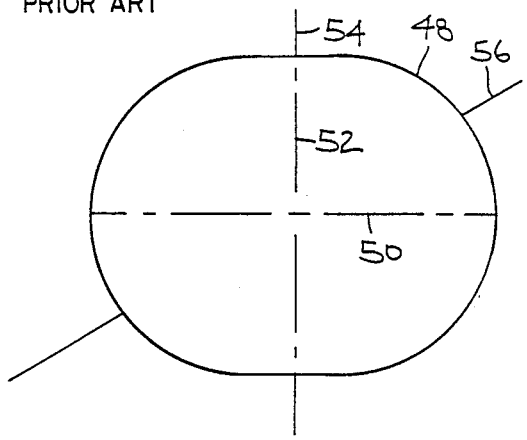
FIG. 4 is a schematic view of a cross section taken through a piston proximate the wrist pin and along a plane perpendicular to the direction of axial movement of the piston, and shows an outer peripheral generally oval shape having a minor axis along the wrist pin as known in the prior art.

FIG. 4 schematically shows the outer profile of a cross section taken through piston 20 proximate wrist pin 26 and along a plane perpendicular to the direction of axial movement of the piston. The cross section has an outer peripheral generally oval shape 48, which ovality has been exaggerated in FIG. 4 for purposes of illustration. Oval shape 48 has a major axis 50 along the largest diameter dimension, and a minor axis 52 along the smallest diameter dimension. In the prior art, minor axis 52 is along and aligned with the center line 54 of wrist pin 26. Line 56 is a line through the intake and exhaust ports 16 and 18.

Figure 5:
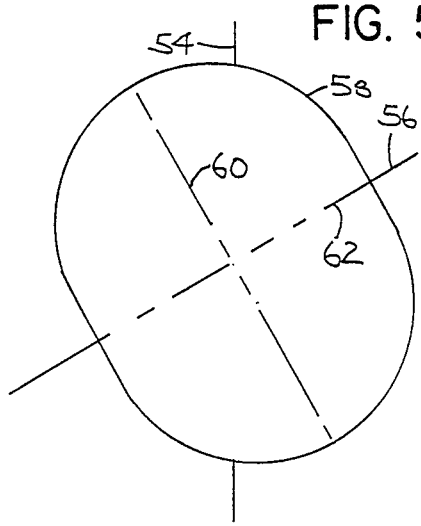
FIG. 5 is a view like FIG. 4 but shows the minor axis offset from the wrist pin to a line through the intake and exhaust ports, in accordance with the invention.

FIG. 5 is a view like FIG. 4, but illustrates offset ovality in accordance with the invention. FIG. 5 schematically shows a cross section through piston 20 proximate wrist pin 26 and along a plane perpendicular to the direction of axial movement of the piston. The cross section has an outer peripheral generally oval shape 58 with a major axis 60 along the largest diameter dimension, and a minor axis 62 along the smallest diameter dimension. Minor axis 62 extends along and is aligned with line 56 through intake and exhaust ports 16 and 18. In the present invention, minor axis 62 is offset from wrist pin center line 54 towards line 56 through the ports, and preferably minor axis 62 extends through the intake and exhaust ports along line 56.

Figure 6:
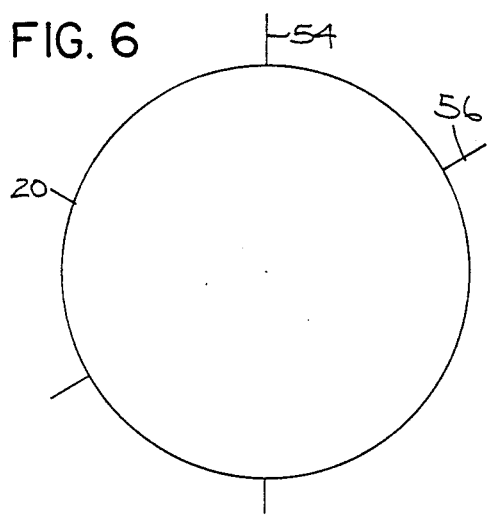
FIG. 6 is a sectional view taken along line 6—6 of FIG. 3.
Figure 7:
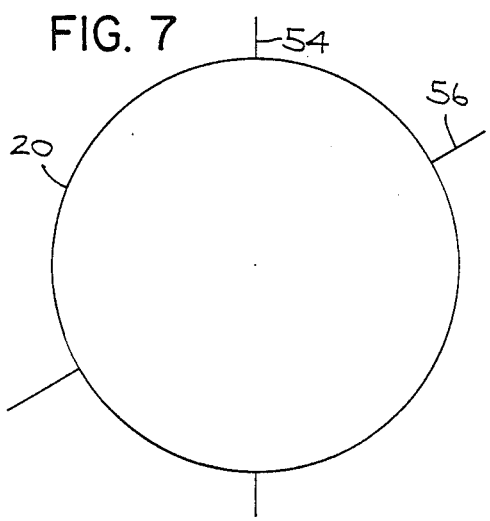
FIG. 7 is a sectional view taken along line 7—7 of FIG. 3.
Figure 8:
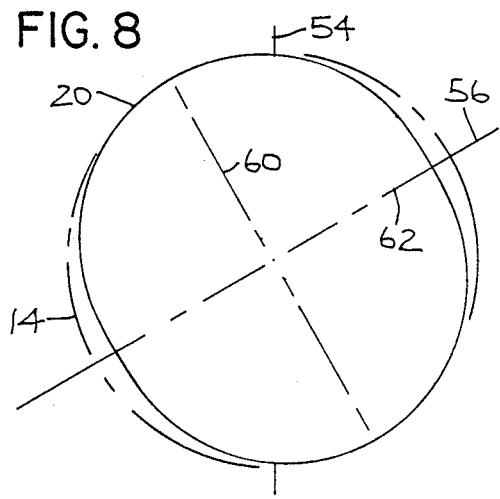
FIG. 8 is a sectional view taken along line 8—8 of FIG. 3, with the ovality exaggerated to facilitate understanding.
Figure 9:
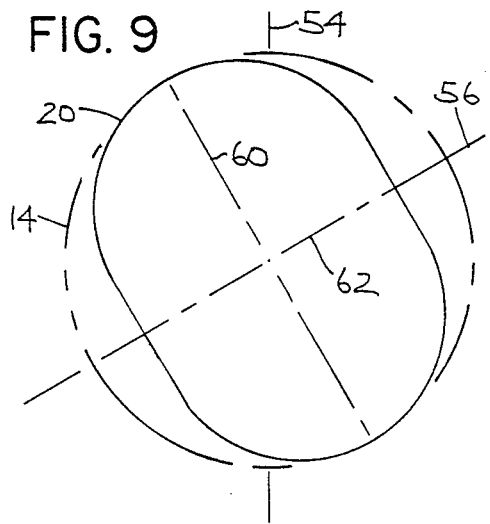
FIG. 9 is a sectional view taken along line 9—9 of FIG. 3, with the ovality exaggerated to facilitate understanding.

In another aspect of the invention, cross sections through the piston have outer peripheral shapes with increasing ovality from at least wrist pin 26 upwardly to at least rings 22 and 24. This is illustrated in FIGS. 6–9. FIG. 6 shows that the piston is round at the bottom, and this roundness is continued upwardly preferably to about the level of line 7—7. The piston then becomes more and more oval, as illustrated in FIGS. 8 and 9 where the ovality at the level of line 8—8 is greater than that at the level of line 7—7, and the ovality at the top of the piston as shown in FIG. 9 is greater than the ovality at the level of line 8—8. In other embodiments, ovality begins to increase from the bottom of the piston upwardly. In further embodiments, ovality increases up to the level of rings 22 and 24, but the top of the piston is round. As shown in FIGS. 8 and 9, the increasing ovality is provided in accordance with FIG. 5 such that the minor axis 62 is offset from the wrist pin at line 54 towards and preferably through the intake and exhaust ports at line 56.

The cylinder bore 14 is shown in phantom in FIGS. 8 and 9. The ovality shown in FIGS. 8 and 9 is exaggerated for purposes of illustration. Skirt portion 64, FIG. 1, of piston 20 below wrist pin 26 has a closer tolerance and smaller gap from cylinder bore 14 than the remainder of the piston thereabove.

It is recognized that various equivalents, alternatives and modifications are possible within the scope of the appended claims.

We claim:

1. In a two cycle internal combustion engine having a combustion chamber defined by a cylinder bore having facing generally distally opposite intake and exhaust ports, a piston axially reciprocal in said cylinder bore, said piston having a wrist pin extending thereacross and rotatably journaled to the upper end of a connecting rod, which rod has a lower end rotatably journaled to a crankshaft, said piston having a cross section therethrough proximate said wrist pin and along a plane perpendicular to the direction of said axial movement, said cross section having an outer peripheral generally oval shape with a major axis generally along the largest diameter dimension and a minor axis generally along the smallest diameter dimension, said minor axis being offset from said wrist pin toward a line through said ports.

2. The invention according to claim 1 wherein said minor axis extends through said ports.

3. In a two cycle internal combustion engine having a combustion chamber defined by a cylinder bore having facing generally distally opposite intake and exhaust ports, a piston axially reciprocal in said cylinder bore, said piston moving upwardly in a charging stroke, and downwardly in a power stroke, said piston having one or more piston rings therearound near the top thereof, said piston having a wrist pin below said piston rings and extending across said piston and rotatably journaled to the upper end of a connecting rod, which rod has a lower end rotatably journaled to a crankshaft, said piston having a plurality of cross sections therethrough each along a plane perpendicular to the direction of said axial movement and axially spaced from one another, said cross sections having outer peripheral shapes with increasing ovality from at least said wrist pin upwardly to at least said rings.

4. The invention according to claim 3 wherein the outer peripheral shape of said cross section at the top of said piston is oval and is of greater ovality than any other outer peripheral shape of any other said cross section.

5. The invention according to claim 3 wherein the outer peripheral shape of said cross section at the bottom of said piston is round, and wherein said ovality increases from the bottom of said piston upwardly to at least said rings.

6. The invention according to claim 3 wherein the outer peripheral shape of said cross section at the bottom of said piston is round and the outer peripheral shapes of the cross sections from the bottom of said piston upwardly partially toward said wrist pin are round, and wherein said ovality increases from the upper most of said round cross sections upwardly to at least said rings 7. In a two cycle internal combustion engine having a combustion chamber defined by a cylinder bore having facing generally distally opposite intake and exhaust ports, a piston axially reciprocal in said cylinder bore, said piston moving upwardly in a charging stroke, and downwardly in a power stroke, said piston having one or more piston rings therearound near the top thereof, said piston having a wrist pin extending thereacross beneath said piston rings and rotatably journaled to the upper end of a connecting rod, which rod has a lower end rotatably journaled to a crankshaft, said piston having a plurality of cross sections therethrough each along a plane perpendicular to the direction of said axial movement and axially spaced from one another, the cross section proximate said wrist pin having an outer peripheral generally oval shape with a major axis generally along the largest diameter dimension and a minor axis generally along the smallest diameter dimension, said minor axis being offset from said wrist pin toward a line through said ports, said cross sections having increasing ovality from at least said wrist pin upwardly to at least said rings.

8. The invention according to claim 7 wherein said piston has a skirt portion below said wrist pin, and wherein in combination said skirt portion has a closer tolerance and smaller gap from said cylinder bore than the remainder of said piston thereabove.

* * * * *